United States Patent [19]
Golden et al.

[11] Patent Number: 5,239,128
[45] Date of Patent: Aug. 24, 1993

[54] FIELD ENCAPSULATABLE SPLICE CABINET

[75] Inventors: John L. Golden, Rockaway, N.J.; Howard D. Rhoten, Omaha, Nebr.

[73] Assignee: AT&T Bell Laboratories, Murray Hill, N.J.

[21] Appl. No.: 814,735

[22] Filed: Dec. 27, 1991

[51] Int. Cl.$^5$ ............................................. H01R 9/22
[52] U.S. Cl. ......................................... 174/50; 174/59
[58] Field of Search ............................. 174/50, 59, 60

[56] References Cited

U.S. PATENT DOCUMENTS

| | | | |
|---|---|---|---|
| 1,223,750 | 4/1917 | Wakefield | 174/59 |
| 1,956,534 | 4/1934 | Mample | 174/60 X |
| 1,964,871 | 7/1934 | Cook | 174/60 |
| 2,567,740 | 9/1951 | Smith, Jr. | 174/50 X |
| 2,667,529 | 1/1954 | Chapman | 174/60 X |
| 2,871,457 | 1/1959 | Jencks et al. | 174/50 X |
| 3,836,696 | 9/1974 | Gressitt et al. | 174/59 X |
| 4,913,659 | 4/1990 | Doyle | 439/395 |
| 5,017,155 | 5/1991 | Doyle | 439/532 |

Primary Examiner—Leo P. Picard
Assistant Examiner—David A. Tone
Attorney, Agent, or Firm—Ruloff F. Kip

[57] ABSTRACT

An improvement is disclosed for a cabinet housing separate arrays of terminals connected to one end of leads in wire harnesses, the other end of such harness leads being connected through splices to insulated wire leads in field cables running to such cabinet and respective to such arrays. The leads in separate of such cables are electrically coupled by connections including such splices, harness leads and terminals and completed by jumper leads bridging terminals in separate of such arrays. The improvement constitutes providing on the back side of the cabinet a plurality of splice chambers each respective to one of the terminal arrays and one of the cables, placing in each splice chamber the splices of the harness leads for the corresponding terminal array and the wire leads of the corresponding cable, and filling such chamber with a body of material which encapsulates the assembly of such splices and adjacent lengths of such leads.

12 Claims, 8 Drawing Sheets

FIELD ENCAPSULATABLE SPLICE CABINET

FIELD OF THE INVENTION

This invention relates to cabinets for containing and holding telecommunications apparatus coupled to telephone field cables extending to and terminating in free ends at or close to the cabinet. More particularly, this invention relates to cabinets of such kind containing separate terminal arrays of which the respective terminals are, on the one hand, interconnected in the cabinet with each other and, on the other hand, are connected through splices with insulated wire leads in separate of such cables to thereby provide a "through" electrical coupling of leads in such separate cables.

BACKGROUND OF THE INVENTION

In the prior design of cabinets of the kind described, terminals in each of the terminal array in the cabinet are respectively connected to corresponding leads in a stub length of cable running outward from the cabinet housing. Each cabinet has several of such stub cable lengths extending out therefrom. The electrical connection of the leads in the several cables to respective terminals in the corresponding terminal arrays was effected by providing splices, at the free ends of the stub cable lengths and cables, of leads in, respectively, such stub lengths and cables. The making of such splices, however, required a splice pit or nearby manhole for splicing the stub lengths and cables. As another disadvantage, the splices so made were often not well protected against the deleterious effects of weather or other factors detrimental to the integrity of such splices.

SUMMARY OF THE INVENTION

One or more of the aforementioned disadvantages are obviated according to an aspect of the invention by providing a splice cabinet for cables comprising a housing having therein a frontwardly opening bay, wall means bounding and backing the rear of said bay, horizontally spaced arrays of terminals disposed on the front side of said wall means, a plurality of wire harnesses respective to said arrays and each comprising insulated wire leads having ends attached in said bay to terminals in the corresponding array, and having other free ends at a free end of the harness, splice chamber means disposed on the back side of said wall means and having bottom openings therein and inner openings through said wall means for insertion into said chamber means of the free ends of, respectively, leads in said cables and leads in said harnesses, means enabling the making of splices of such cable leads and harness leads at their free ends after passage of such cable leads and harness leads through, respectively, said bottom openings and said inner openings, and means facilitating introduction into said chamber means of encapsulant material for encapsulating said splices in said chamber means. By arranging for encapsulating within the cabinet itself of the mentioned splices, the need for a splice pit or nearby manhole is avoided. Also, the splices so encapsulated will be well protected by the encapsulant material from weather and other extraneous detrimental influences.

BRIEF DESCRIPTION OF THE DRAWINGS

For a better understanding of the invention, reference is made to the following description of an exemplary embodiment thereof and to the accompanying drawings wherein.

In the description which follows, counterpart elements are designated by the same reference numbers but different alphabetical suffixes for such numbers, and, unless the context otherwise requires, a description of one such element applies equally to its one or more counterparts.

DETAILED DESCRIPTION OF THE EMBODIMENT

Figure 1:
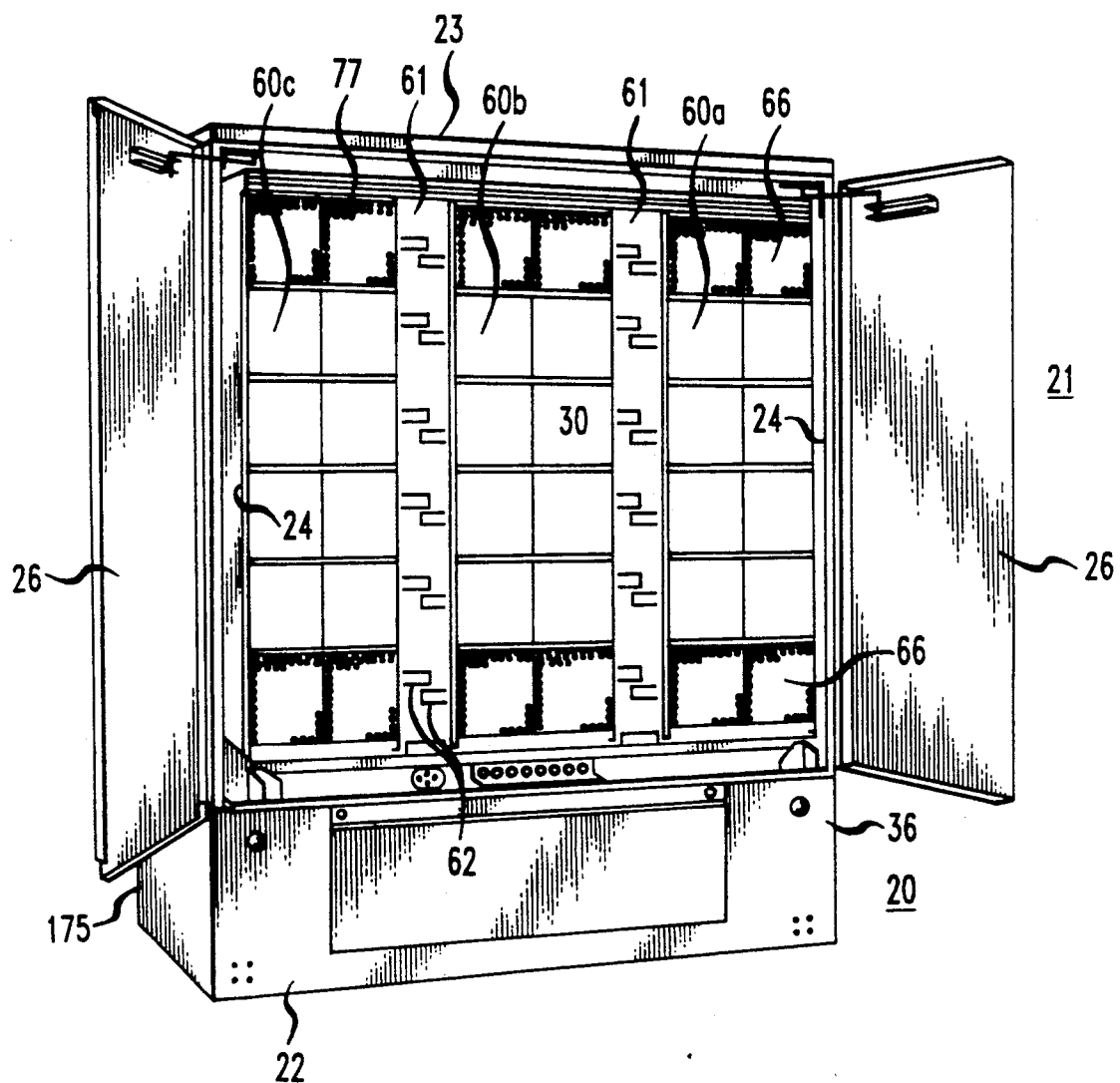
FIG. 1 is an isometric front elevation of a cabinet exemplifying the invention.

Referring now to FIG. 1, the reference number 20 designates a field encapsulatable splice cabinet of which a principal component is a housing 21. Such housing comprises a horizontal base 22, and top 23 and vertical side walls 24. Parts of the elements 22-24 extend around and bound the sides of a bay 30 contained in housing 21. Bay 30 has a large rectangular opening on the frontward side of the cabinet. The housing 21 carries doors 26 for selectively closing the opening to bay 30. The housing contains at its top, to the rear of such opening, a brace 27 of "L" cross-section having a horizontal web 28 (FIGS. 3 and 5) fastened to housing top 23 and a vertical web 29 downstanding from that top.

The base 22 of the housing comprises a sheet metal stand 31 consisting of a horizontal shelf 32 and a vertical pedestal 33 connected at its top by a bend in the sheet metal to the rear of the shelf to support it. Shelf 32 at its horizontally opposite ends has end flanges 34 for fastening it to the side walls 24 of the housing 21. The shelf also has at its front an edge flange 35 by which it may be fastened to a front cover 36 helping to support the front of the shelf and concealing from view the space beneath it.

Figure 3:
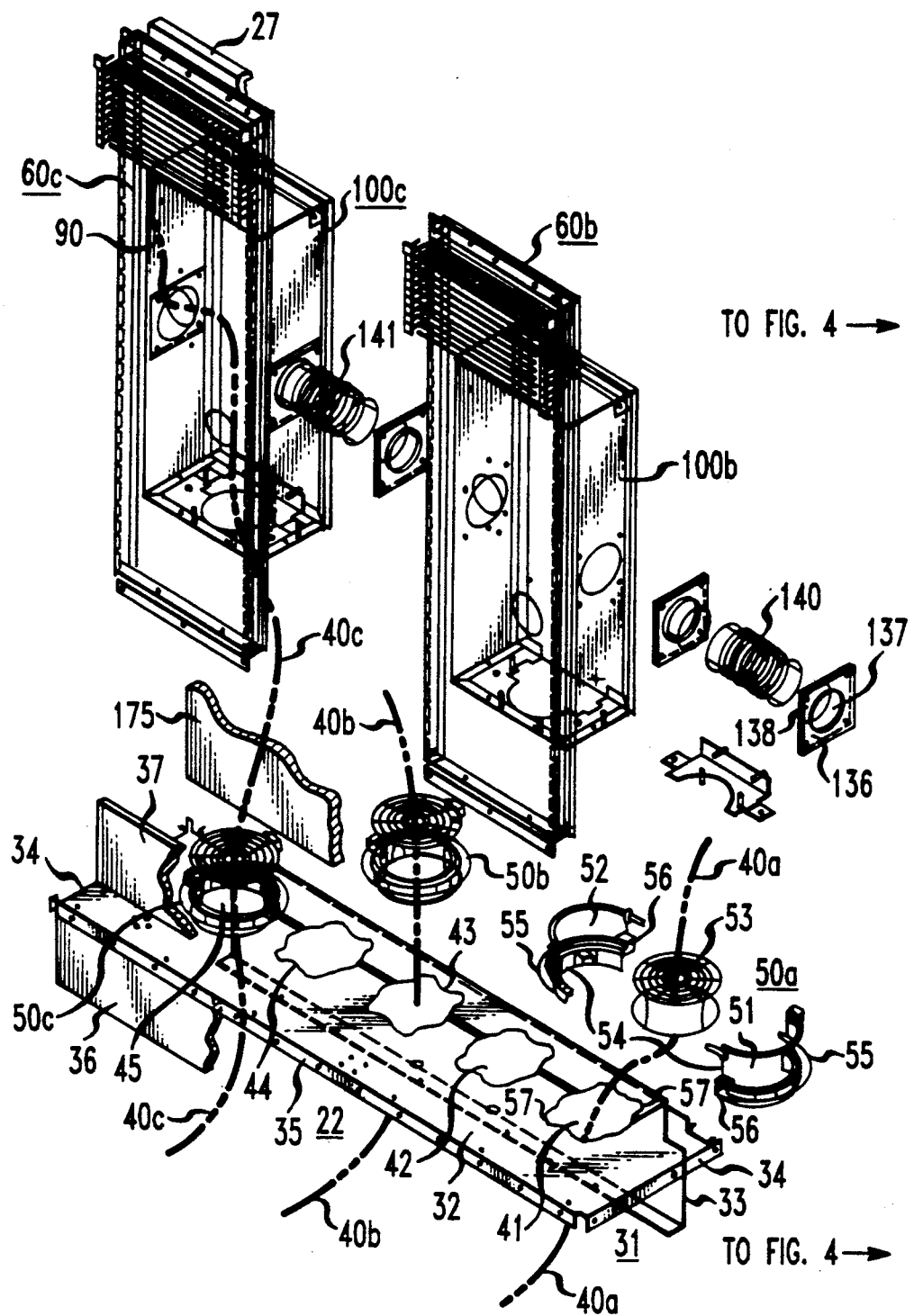
FIGS. 3 and 4 are, taken together, an exploded isometric front elevational view of major components of the FIG. 1 cabinet, the combined view provided by FIGS. 3 and 4 being obtained by registering the heads of the fiducial arrows on the right hand side of FIG. 3 with the heads of the fiducial arrows on the left hand side of FIG. 4.

The shelf 32 supports part way to its rear a longitudinally and vertically extending partition 37 (FIGS. 3 and 5) upstanding from the shelf and of relatively low height and dividing in the transverse, or front to rear direction, the bay 30 from the space behind it. Rearward of partition 37, the shelf 32 has formed therein a set of horizontally spaced ports or ducts 41-45 for upward passage through the shelf of lengths at their free ends of a plurality of field cables arriving at cabinet 20 from a distance, and each containing many pairs of insulated wire telephone conductors or leads. In FIG. 3, three of such cables are schematically depicted by long dash short double-dash lines, and they constitute a feeder cable 40b through the central port 43 and distribution cables 40a and 40c through the end ports 41 and 45. Feeder cable 40b runs from a central office to the installation 20. Distribution cables 40a and 40c run from that installation to stations of telephone sets in the locality of the cabinet 20.

The passage of the cables 40a, 40b, 40c through the ports 41, 43, 45 is sealed by corresponding moisture seals 50a, 50b, 50c. Seal 50a comprises two generally semicylindrical plastic shells 51, 52 and a central resilient cylindrical core 53 consisting of rectangular rubber sheets which are curved into the form of concentric split rings registering with each other so that a slit opening common to all the rings extends radially from the periphery of the core to its center. By removal of a selected number of inner ones of such rings, the vertical axial aperture through the core is adjusted in diameter to be adapted to make a sealing fit with the outside of cable 40a.

At a time prior to passage of the cable through port 41, the cable is moved sideways through the mentioned slit opening in core 53 into its central aperture so that a length of the cable at its free end projects upward from the cover. Next, the two plastic shells 51, 52 are displaced towards each other to surround core 53. They are then locked together to form a single annular sleeve 54 surrounding the core 53 and the cable 40a therein. Sleeve 54 then has a radial flange 55 and, above such flange, radially projecting lugs 56.

As a subsequent step, the assembly of elements 53, 54 and cable 40a is moved underneath shelf 32 towards duct 41 to pass lugs 56 upward through indentations 57 formed in the periphery of port 41, and to bring flange 55 into contact with the underside of shelf 32. Finally, the mentioned assembly is rotated within port 41 to lock it within the port by a bayonet-type connection.

The moisture seals 50b and 50c are similar in structure and manner of installation to the moisture seal 50a.

The frontwardly opening bay 30 (FIG. 1) is bounded and backed at its rear by wall means comprising three horizontally spaced coplanar terminal assemblies 60a, 60b, and 60c and by two vertical troughs 61 disposed in the spaces between the assemblies 60. The troughs 61 each have a configuration in horizontal cross-section of a frontwardly opening rectangular "U". Those troughs when in use contain lengths of interconnector or "jumper" leads (not shown) having opposite ends electrically connected to terminals in assembly 60b for feeder cable 40b and to terminals in one or the other of the assemblies 60a, 60c for the distributor cables 40a, 40c. The lengths of such jumper leads which are positioned in troughs 61 are kept therein by retainer fingers 62.

The terminal assembly 60a comprises (FIG. 4) a rectangular frame 65, a plurality of terminal blocks 66 mounted and retained in frame 65 to form a column of blocks therein (see FIG. 1) and a rear panel 67 for the assembly.

The frame 65 is similar to the frame described in detail in U.S. Pat. No. 5,017,155 issued May 21, 1991 in the name of C. E. Doyle for "Terminal Boards and Frame Therefor" and assigned to the assignee hereof and incorporated herein by reference and made a part hereof. Top and bottom mounting flanges 68 and 69 on frame 65 are fastened (FIG. 5) to, respectively, the vertical web 29 of brace 27 and the partition 37 to thereby anchor the frame to housing 21.

The terminal blocks 66 may be the same as or similar to the terminal boards described in detail in U.S. Pat. No. 4,913,659 issued Apr. 3, 1990 in the name of C. E. Doyle for "Push Cap Terminals and Terminal Boards with Same" and assigned to the assignee hereof and incorporated herein by reference and made a part of hereof. As described in the earlier mentioned '155 patent, blocks 66 may be first inserted into frame 65 by horizontal motions of the blocks into the frame, and the blocks may be then locked into the frame by their upward or downward displacement relative to the frame.

The frame 65 on its rear side has a surface which is flat and coplanar. The rear panel 67 for assembly 60 is fastened when in use to frame 65 at its rear to make with the frame's rear surface a flush contact extending all around the frame and providing around it a seal preventing leakage through the interface between elements 65 and 67. As shown, the vertical panel 67 has formed therein two circular openings 70 and 71 passing horizontally through the panel in its vertically central region.

Figure 5:
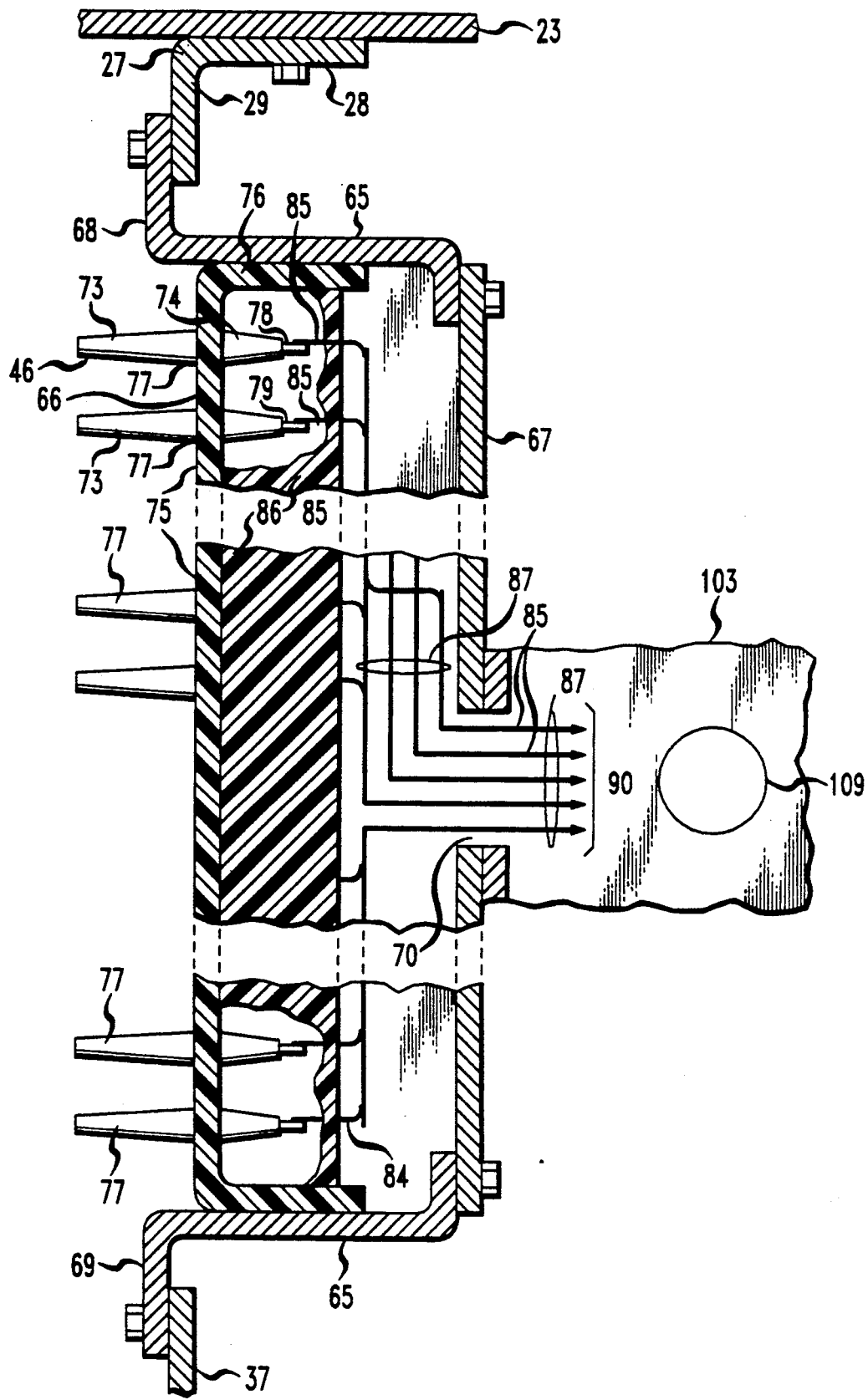
FIG. 5 is a fragmentary schematic left side elevation in cross-section of the rightmost one of the terminal assemblies of the FIG. 1 cabinet before such assembly has been fully encapsulated.

The terminal blocks 66 mounted by frame 65 may vary in number depending on the design of cabinet 20, six of such blocks being shown in FIG. 1. Three of such six blocks are shown by FIG. 5, namely, the upper and lower and a middle one of such blocks. Since all of blocks 66 are essentially the same, only the upper block 66 of FIG. 5 will be described in more detail.

That upper block comprises an upper rectangular vertical plastic board 75 (FIG. 5) having an edge flange 76 extending around its periphery. Board 75 supports a plurality of terminals 77 arranged in rows and columns on the board (see FIGS. 1 and 4). Each terminal comprises a plastic tube 46 integral with board 75 and projecting both frontwardly and rearwardly from board 75. Each terminal contains within such its plastic tube a metallic terminal strip 78 of which the front part (not shown) is contained within the forward projection 73 of the terminal and is adapted to be electromechanically connected to an end of a jumper lead (not shown) inserted into an opening in such front projection. The rear part of strip 78 projects rearwardly of the rear plastic projection 74 of terminal 77 to provide an exposed rearward metallic stem 79 for the terminal 77.

In the course of fabrication of the upper terminal block 66 prior to its being mounted in frame 65, the stems 79 of its terminals 77 are electromechanically connected (by a wire wrapping technique further described in the aforementioned '659 patent) to the bare ends of moderate length insulated wire leads 85 respective to those terminals. After all of such lead-to-terminal connections have been made, the upper 'block 66 is positioned to be horizontal and upside down and, when so positioned, is filled with a body 86 of potting compound almost to the top of its edge flange 76. The connections of the leads 85 to the terminals 77 of the upper block 66 thus become encapsulated by that compound.

In the same way, more wire leads 85 or similar wire leads 84 are connected to the terminals of all the other blocks 66 to be mounted in frame 65, and the terminal-lead connections are then encapsulated by potting compound. Once all such blocks 66 have been so treated, they are mounted in frame 65 with its rear panel 67 being detached. The result is that the multiplicity of leads 85 and 84 emerging from the potting compound in such blocks extend loosely therefrom. Such loose leads 85 and 84 are gathered into one or two bundles and are retained in that bundled relation by plastic bindings 87 so as to form one or two wire harnesses comprising elements 85 and 87. FIG. 5 shows an upper harness 90 including the leads 85 from the upper and middle blocks 66. The leads 84 from the lower blocks are included in a lower harness 91 (FIG. 7).

With upper and lower harnesses 90 and 91 being so assembled, the free ends thereof are passed through the upper and lower openings 70 and 71 in rear panel 67 while it is still somewhat detached from frame 65, and the harnesses are then drawn through those openings as far as the harnesses will easily go. The panel 67 is then fastened to the frame, there being sufficient clearance between this panel and the outside surface of the potting compound 86 to accommodate the portions of harnesses 90, 91 inside the panel.

Figure 6:
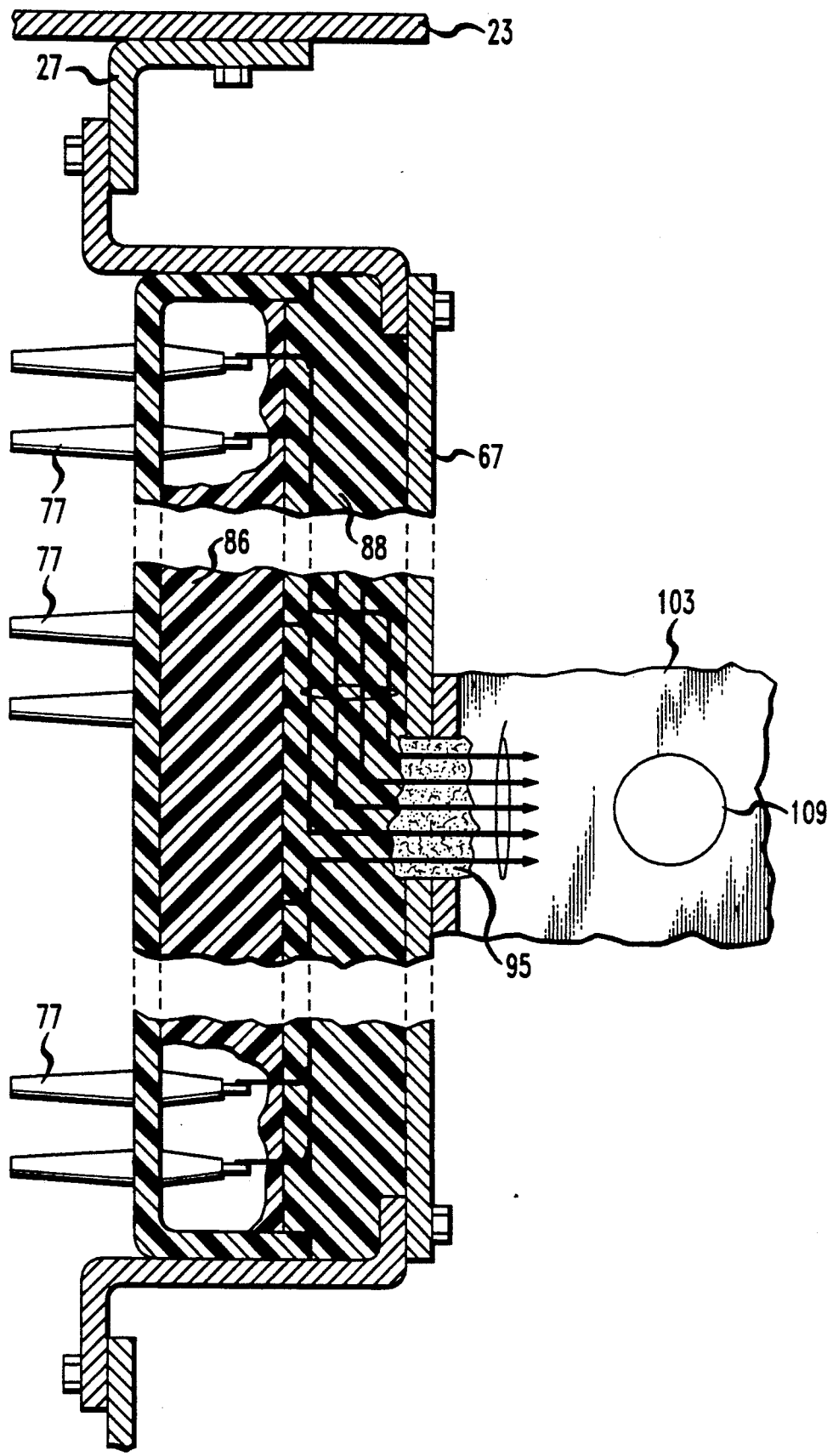
FIG. 6 is a view of the FIG. 5 assembly after the assembly has been fully encapsulated.
Figure 7:
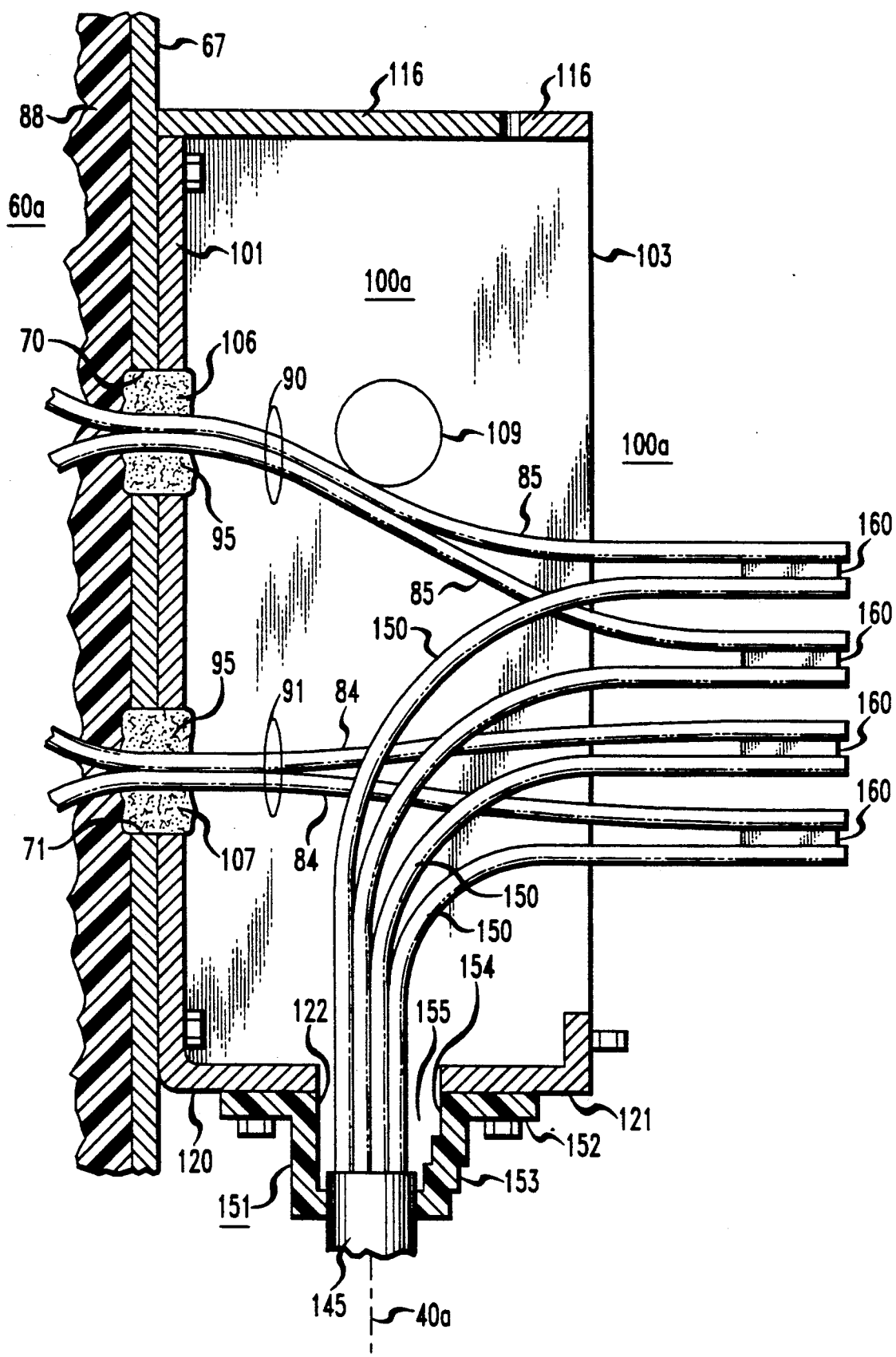
FIG. 7 is a fragmentary schematic left side elevation in cross-section of the rightmost splice chamber of the FIG. 1 cabinet and of associated splicable elements after such elements have been spliced but before they have been encapsulated.

Referring now to FIGS. 6 and 7, the assembly of frame 65, blocks 66, panel 67 and harnesses 90, 91 is placed horizontal with panel 67 being upward, and a mass of putty 95 is applied to the openings 70 and 71 in the panel and to the harnesses 90, 91 as they pass through those openings to seal the passage through these openings against leakage therethrough of potting compound. Next the assembly is turned upside down from its position just described so that the front side of the frame 65 is uppermost. More potting compound is then introduced into the assembly through entry ways (not shown) to fill the space in the assembly between panel 67 and the original body 86 of compound with an additional body 88 of potting compound. Once such body 88 has set, the fabrication of terminal assembly 60a (which now includes harnesses 90 and 91) has been completed, and the assembly is fastened to housing 21 by the mounting flanges 68 and 69 of frame 65 as earlier described.

Each of the other terminal assemblies is essentially the same in structure and mode of fabrication thereof as the terminal assembly 60a. By virtue of the inclusion of assemblies 60a–60c in cabinet 20, such cabinet includes, on the front side of the mentioned wall means which backs and bounds the rear of bay 30, a plurality of horizontal spaced terminal arrays of which each array is provided by the terminals included in one of such assemblies 60a, 60b, 60c.

Continuing with the structure of cabinet 32, such cabinet has on the back side of the wall means just mentioned a splice chamber means comprising three horizontally spaced splice chambers 100a, 100b, and 100c respectively corresponding to the terminal arrays provided by assemblies 60a, 60b, and 60c and each disposed behind its respective array on the back side of the wall means of which such array is on the front side. Since the splice chambers 100a–100c all have the same structure, only the chamber 100a will be described in detail.

The splice chamber 100a is in the shape of a box partly enclosed by vertical walls formed from a single sheet metal piece and consisting of an inner wall 101 and horizontally spaced side walls 102, 103 joined to the horizontally opposite edges of wall 101 by right angle bends in the sheet metal. The side walls 102, 103 at their rear edges have inturned edge flanges 104, and all three of the walls 101, 102, 103 at their bottoms have inturned edge flanges 105. The inner wall 101 has circular openings 106, 107 therein matching the circular openings 70, 71 of the rear panel 67 of terminal assembly 60a. The wall 101 when in use is fastened to panel 67 so that openings 106 and 107 register with, respectively, openings 70 and 71 (FIGS. 7 and 8) to provide clear passages through the two sets of openings for the wire harnesses 90 and 91 from the terminal assembly 60a to the interior of splice chamber 100a.

The side walls 102, 103 have formed therein respective openings 108, 109 the purpose of which will be later explained.

The chamber 100 at its top rear has a brace 115 permanently fastened at opposite ends to the side walls 102, 103. Inward of brace 115, the chamber or box 100a has a lid 116 snap fittable on side walls 102, 103 to provide for such a box a top closure which is selectively removable and replaceable.

A bottom for box 100a is provided by inner and outer horizontal plates 120 and 121 which are configured so that, when assembled together, they cooperatively define a circular opening 122 up through the bottom of the box.

Inner plate 120 is fastened to the underside of the bottom edge flanges 105 of the vertical walls 101-103 so that the plate makes flush contact with these edge flanges except for two upwardly projecting lips 123 on plate 120 which, when the plate is so fastened, are disposed just to the rear of the rear edges of walls 102, 103, and which lips extend slightly up beyond the bottoms of those walls.

The outer plate 121 has a main portion 124 of the same thickness as plate 120. Outer plate 120 also has a pair of tabs 125 which extend horizontally outward from opposite longitudinal sides of the main part 124 of that plate, and which tabs 125 are vertically displaced downwards from that main part so that the upper surfaces of such tabs are coplanar with the lower surface of such part. The outer plate 121 is intended to be selectably removable from, and replaceable at, the bottom of splice chamber 100a. When that plate is installed, the tabs 125 are beneath and make flush contact with the underside of inner plate 120 and are fastened to that plate by bolts therefrom passing through holes in such tabs. When the tabs 125 are so fastened, the main part 124 of the outer plate 121 fits within the irregular "cutout" shown in inner plate 120 so that the upper and lower surfaces of such main part of the outer plate are at the same level as those of the main part of the inner plate, and so that the two plates cooperatively define the mentioned circular opening 122 passing through the plate combination. The outer plate 121 has a rearward lip 126 which, when the two plates are fastened together, fits between the rear lips 123 on plate 120.

An additional selectively removable and replaceable cover for chamber 100a is provided by a rear cover 130. The cover when removed provides access from the rear to the interior of the chamber. When, however, it is desired to close that interior on all sides, the cover 130 may be fastened at its top to brace 115, along its sides to the edge flanges 104 on side walls 102, 103 and, at its bottom, to the lip 126 on bottom plate 121. The cover 130 has on its inner side around its periphery a gasket (not shown) to prevent leakage at such periphery of encapsulant material from the chamber 100a when the cover 130 is installed.

In chamber 100a, the opening 108 in side wall 102 is not used and is closed by a blind closure plate 135 fastened to the outside of wall 102. The opening 109 in side wall 103 is however used. Fastened to the outside of that side wall is a square plate 136 (FIG. 3) having a circular opening 137 therein registering with opening 109 and having an outwardly horizontally projecting annular collar 138 surrounding opening 137. In use, collar 138 is received in one end of a plastic horizontal express tube 140 having a bellows construction permitting moderate lengthwise expansion and constriction of the tube. The other end of the tube fits over a similar collar 138 mounted on that side wall of chamber 100b which is nearest to the adjacent splice chamber 100a. The two ends of the tube 140 are clamped to the two collars over which they are respectively fitted by the use of metal clamp bands of adjustable length (not shown) of the type described in copending U.S. patent application Ser. No. 07/606,026, filed Oct. 30, 1990, in the names of M. K. Dixit and R. D. Smolen for Cable Seal and assigned to the assignee hereof, such patent application being incorporated herein by reference and made a part hereof.

The splice chambers 100b and 100c are joined by an express tube 141 similar to the tube 140 just described. The splice chambers 100b and 100c are, as stated, substantially the same in structure as the splice chamber 100a which has been described herein in detail.

Figure 8:
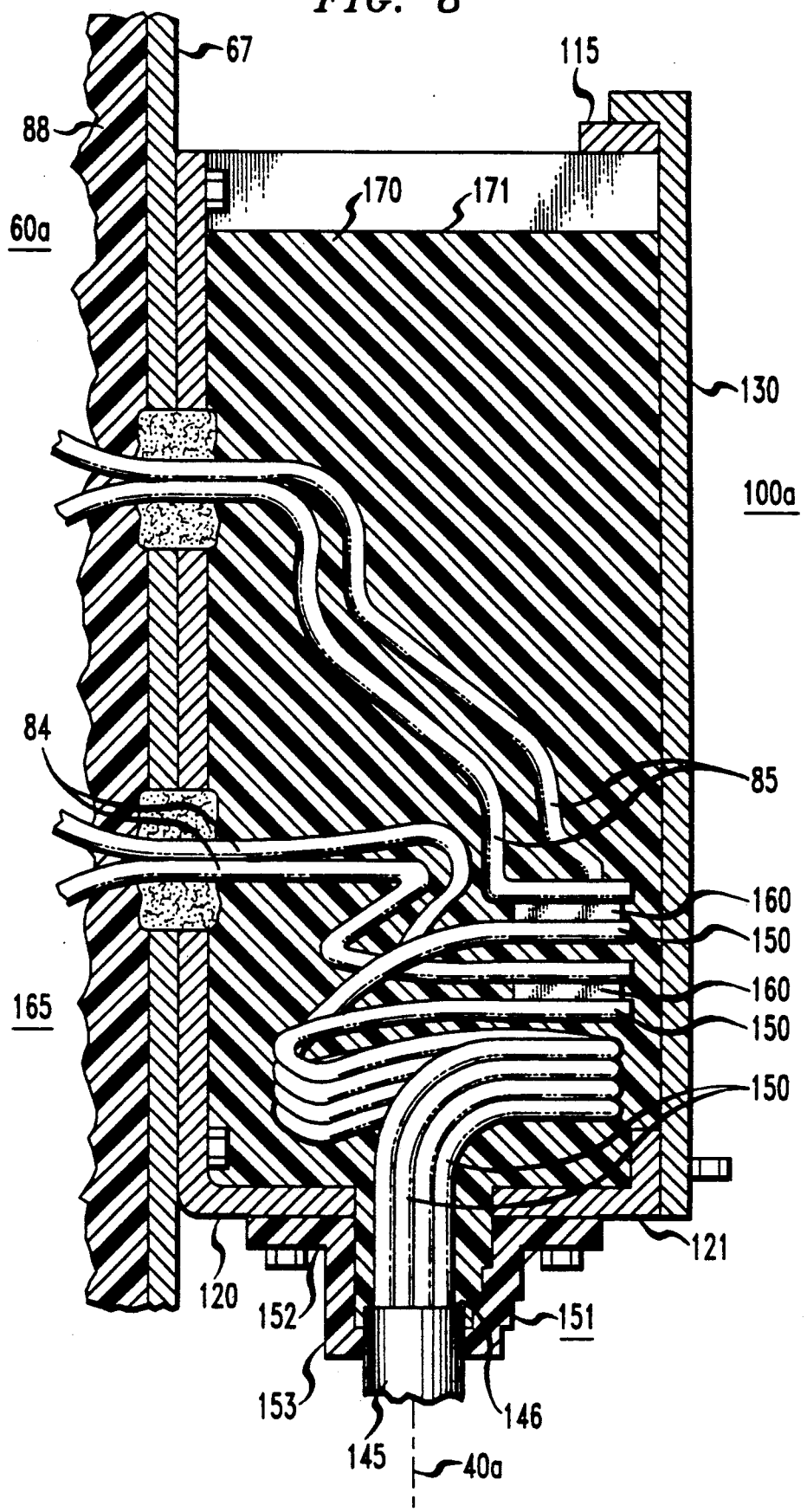
FIG. 8 is a view of the FIG. 7 splice chamber and associated splicable elements after such elements have been encapsulated.

FIGS. 7 and 8 are relevant to the use of the splice chamber 100a. Referring to those figures, the splice chamber 100a may be fastened by its inner wall 101 to the rear panel 67 of the corresponding terminal assembly 60a either before or after that assembly has been fully filled with potting compound 88 as shown in FIG. 6. If chamber 100a is fastened to panel 67 before assembly 60a is so filled with compound 88, then, following such fastening, assembly 60 is filled with compound 88 and afterwards the putty 95 is applied (FIG. 7) to seal the passages through the openings 106, 107 through chamber wall 101 as well as the passages 70, 71 through the rear panel 67 of the terminal assembly 60a. Whether, however, such fastening is before or after assembly 60a filled with compound 88, a step in the use of the the chamber is the passing of the wire harnesses 90, 91 through the sets of apertures 70, 106 and 71, 107 into the interior of the chamber 100a. The rear cover 130 for the chamber is at that time removed from its back. The lengths of the harnesses on the back side of those apertures are drawn out rearwardly through the opening left by the removal of cover 130 until the free ends of such harnesses are well outside and to the back of the splice chamber 100a. The harnesses 90 and 91 are also unbundled at their free ends to release from the harness bindings lengths of harness leads 85 and 84 in, respectively, the harnesses 90 and 91. Such free end lengths of such leads are thus loose and separable from each other as shown in FIG. 7.

The field distributor cable 40a associated with splice chamber 100a has earlier been described as passing upward through moisture seal 50a (FIG. 3). Above the seal 50a, the cable 40a is treated as follows. The cable sheath 145 is removed approximately one inch below the horizontal plates 120 and 121 which provide bottom closures for the splice chamber. The removal of that sheath exposes and relieves from the constriction of such sheath the multiplicity of insulated wire leads 150 (FIG. 7) contained within the cable.

Next, there is installed on the cable a rubberized seal 151 in the form of an annular resilient seal having at its top an annular mounting flange 152 and consisting below its top of a hollow downwardly converging cone 153 with an interior wall 154 which bounds a stack of axially-short circular cylindrical openings 155 of progressively decreasing diameter in the downward direction. The cone of the installed seal extends rearward of the point of removal of the cable sheath, and the cone is cut off at the point which leaves bottommost in it the one of such openings making the best sealing fit with the sheath 145 of the cable 40a. An adjustable length metal clamping band (not shown) of the kind described earlier is clamped around cone 153 to create a good seal between the cable sheath and that opening.

With the seal 151 thus riding on the cable 40a, mutligroup cable binders in the cable are cut and removed to leave loose and separable from each other the leads 150 of the cable over lengths thereof extending rearward from the free ends of the leads. The ends of the leads are taped to retain twist and pair identity.

The steps described above are performed before any part of cable 40a enters the splice chamber 100a. After these steps have been completed, and with the rear cover 130 of splice chamber 100 being removed, the pairs of wire leads 150 are threaded upward through the opening 122 in the bottom of the splice chamber and are then drawn rearwardly so that the free ends of the leads 150 are disposed outside and to the back of the chamber. The passage of such leads through such opening may be aided by temporary removal of plate 121 from the bottom of chamber 100 and replacement thereafter of the plate. Seal 151 is then fastened to the bottom of chamber 100a by bolts passing from plate 120, 121 through the flange 152 of the seal.

After the seal 151 has been so mounted, some pairs of leads 150 of the distributor cable 40a may be routed through the express tubes 140 and 141 to the splice chamber 100c so to be ultimately connected through splices and wire harness leads to terminals in the terminal array 60c rather than to terminals in the array 60a. Conversely, some leads from the distributor cable 40c may be routed through chamber 100c, tube 141, chamber 100b, and tube 140 to chamber 100a. Thus, the express tubes provide the utility that if the terminal array 60a for example, does not of itself have enough terminals to serve the needs of distributor cable 40a, some of the terminals of array 60c may be dedicated to serve that purpose.

The stage has now been reached where both the end lengths of the leads 85 and 84 of respectively the wire harnesses 90 and 91 and the end lengths of the leads 150 of cable 540a are outside and rearward of splice chamber 100a. With those end lengths being so positioned, the harness leads, 85, 84 are electrically spliced outside the chamber to the cable leads 150 by the use of splice devices 160 known in the art as 710 Connectors. It is evidently advantageous to be able to perform such splicing step outside of the chamber 100a rather than in it because of the much greater space made thereby available for undertaking the splicing operation.

When all the needed splices have been made, the devices 160 and the portions of leads 85, 84 and 150 adjacent to and connected to those devices are gathered together to form a bundle 165. That bundle is then placed (FIG. 8) back in the interior of splice chamber 100a so that all parts of the harnesses 90 and 91 and cable 40a which have been passed into the chamber through the openings 106, 107, 109 and 122 are disposed within such interior.

The rear cover 130 for chamber 100a is then placed at the chamber's rear opening and is fastened by bolts to (FIG. 4) the brace 115, edge flanges 104, and bottom lip 126 to squeeze the gasket (not shown) on the cover between it and the last named elements so to provide a seal against leakage from the chamber interior through the interface between such elements and the cover 130. The rubber seal 151 prevents leakage from such interior out through the bottom of the chamber, and the putty seals in the openings 70, 106 and 71, 107 prevent leakage from the chamber 100a into terminal assembly 60a. Thus, chamber 100a is sealed against leakage at its bottom and all of its vertical sides except for leakage through express tube 140.

With the chamber 100a being in the sealed condition just described, its lid 116 is removed (FIGS. 7 and 8) and encapsulant material 170 is introduced into chamber 100a by pouring it through the top opening left by the lid's removal. Such encapsulation material may be either one of the materials known in the art as D1000 Encapsulation or EZ Entry Encapsulation.

The pouring of such material into chamber 100a is continued until the chamber is filled with a body 171 of it almost to the top of the chamber (FIG. 8). Of course, some of such material may be lost from the chamber by passing through express tube 140. It must be kept in mind, however, that the other splice chambers 100b and 100c will be filled with that material in the same way at about the same time so that, in the end, both of tubes 140, 141 will be filled with it, and all three of the splice chambers will be filled to near their tops with encapsulant. After the chambers have been so filled, the encapsulating procedure is completed by allowing the encapsulant material 170 to set or cure.

As shown by FIG. 8, the described filling of chamber 100a by, and the subsequent curing of, the material 170 serves to completely encapsulate the splices provided by devices 160 of the wire harness leads 85, 84 and the distributor cable leads 150 so as to provide maximum protection of such splices from the deterious effects of weather and other harmful agencies. Similarly, the near filling of the chambers 100b and 100c with cured encapsulant material 170 serves to provide like protection of splices which are positioned in these chambers, and which electrically connect wire harness leads from the terminal assemblies 60b, 60c with leads of, respectively, the field cables 40b and 40c directed to such chambers. It is to be noted that usually much greater lengths of wire harness leads and cable leads are contained and encapsulated within the splice chamber than is shown in FIG. 8.

A further sealing effect is that the encapsulant material 170 extends into the interior of cone 153 of seal 151 and then into the cable 40a at the termination 146 of its sheath 145 so as to there provide a seal for the opening of such termination into the cable interior. That is, the material 170 for a distance below such termination fills the interior of the cable sheath 145 and surrounds the leads 150 therein so as to seal the passage of such leads through that opening. Such sealing of the cable at the termination of it sheath is advantageous in that it prevents moisture or other harmful agencies from infusing into the cable interior through that opening and, conversely, prevents the escape of any moisture or the like within the cable sheath 145 into the interior of the cabinet 32.

The above described embodiment being exemplary only, it is to be understood that additions thereto, omissions therefrom and modifications thereof can be made without departing from the spirit of the invention. For example, many of the steps described above as used in order to arrive at the described encapsulating of the splices are steps which need not be practiced in the order in which they are described herein.

Figure 2:
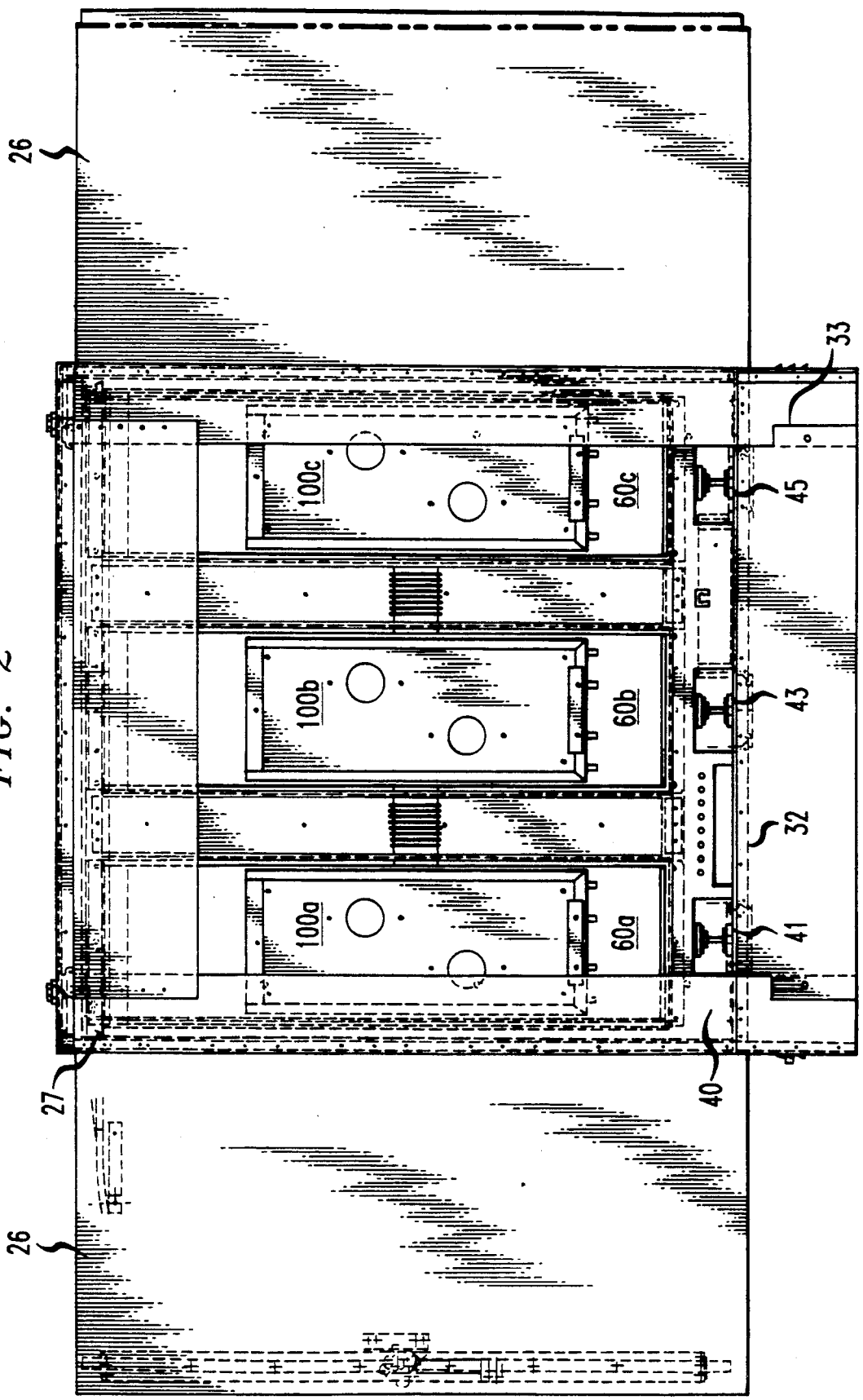
FIG. 2 is a rear elevation of the FIG. 1 cabinet with the rear covers of the cabinet and of the splice chambers therein being removed.
Figure 4:
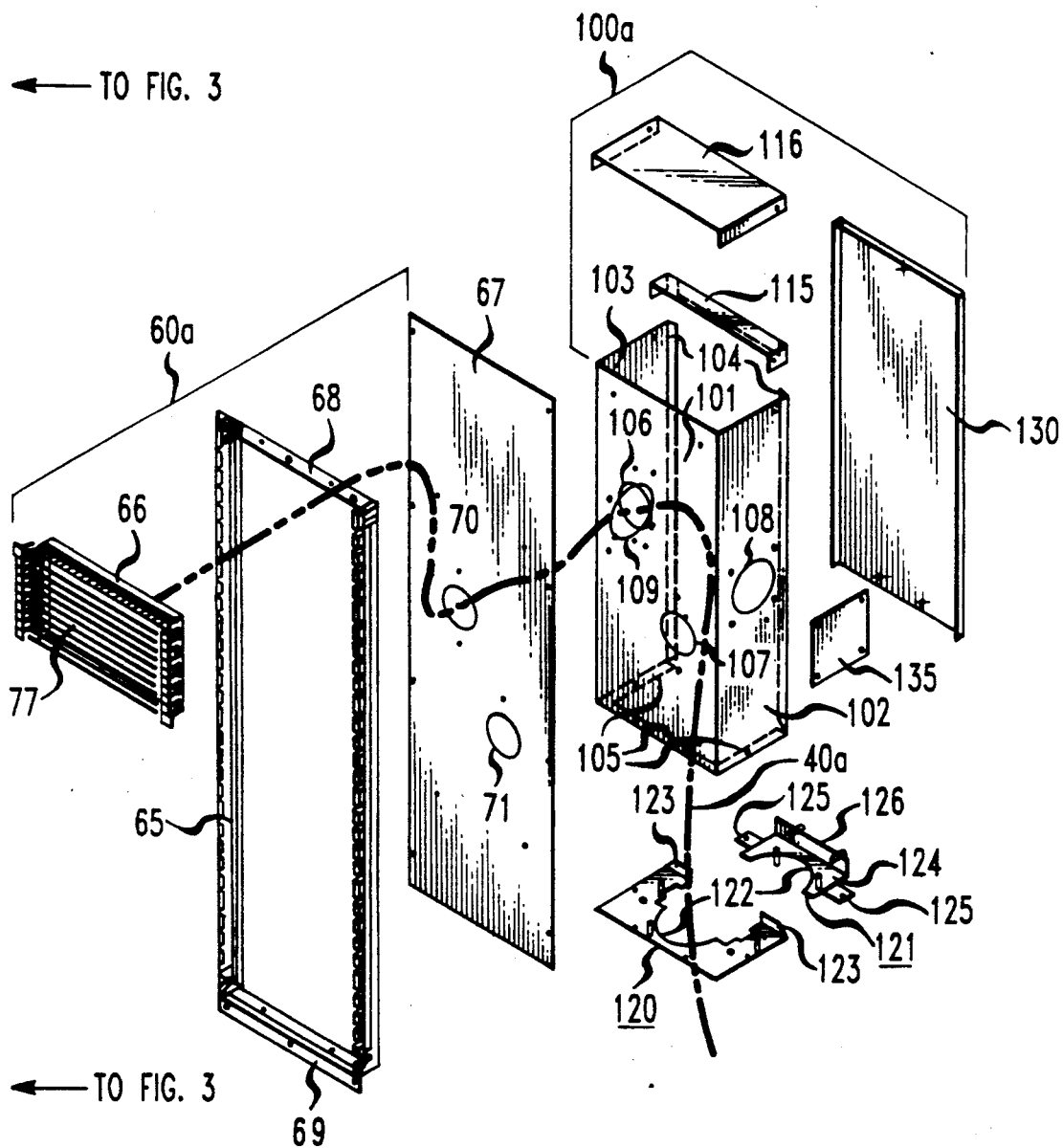

The cabinet 32 has a rear cover 175 of which a portion is shown in FIG. 3, and which is adapted to provide a closure for the entire back of the cabinet (FIG. 2). When the splice chambers 100a, 100b, 100c have been filled with bodies 171 of encapsulant, the rear cover 175 (which may carry a gasket, not shown) is fastened to the cabinet at its back to thereby provide a substantially weather-tight closure. Similar weather-tight closures are provided by the doors 26 when closed and the top 23 and side walls 24 of the cabinet. Also, the horizontal shelf 32 (FIG. 3) of the cabinet base serves, when taken together with the moisture seals 50a, 50b, 50c, to provide a weather-tight closure except for the openings 42 and 44, and those openings may be sealed by the use of square closure plates (not shown) similar to plate 135 (FIG. 4). Thus, the field cables 40a, 40b, 40c can be introduced into the interior of cabinet 32 and led within the cabinet to the splice chambers 60a, 60b, 60c while keeping the cabinet interior substantially sealed from weather conditions.

Accordingly, the invention is not to be considered as limited save as is consonant with the recitals of the following claims.

We claim:

1. A field encapsulatable splice cabinet for cables comprising, a housing having therein a frontwardly opening bay, wall means bounding and backing the rear of said bay, horizontally offset arrays of terminals disposed on the front side of said wall means, a plurality of wire harnesses respective to said arrays and each comprising insulated wire leads having ends attached to terminals in the corresponding array, and having other free ends at a free end of the harness, splice chamber means disposed on the back side of said wall means and having bottom openings therein and inner openings through said wall means thereto for insertion into said chamber means of the free ends of, respectively, leads in said cables and said leads in said harnesses, means enabling the making of splices of such cable leads and harness leads at their free ends after passage of such cable leads and harness leads through, respectively, said bottom openings and said inner openings, and means facilitating introduction into said chamber means of encapsulant material for encapsulating said splices in said chamber means.

2. A cabinet according to claim 1 in which such enabling means comprises selectively removable and replaceable rear closure means for said splice chamber means, said rear closure means when removed providing access from the rear to the interior of said splice chamber means.

3. A cabinet according to claim 1 in which such facilitating means comprises selectively removable and replaceable top closure means for said splice chamber means, said top closure means when removed providing access from the top to the interior of said splice chamber means to permit pouring thereinto of said encapsulant material.

4. A cabinet according to claim 1 in which said cabinet further comprises means for sealing said splice chamber means against leakage therefrom of said encapsulant material.

5. A cabinet according to claim 4 in which said sealing means comprises a plurality of annular resilient sleeves fitting around said cables at said bottom openings of said splice chamber means to seal the passage through said openings for said cables.

6. A cabinet according to claim 1 which further comprises said cable leads, harness leads and splices within said chamber means, and in which said cabinet still further comprises said encapsulant material introduced into said chamber means and encapsulating said splices and adjacent lengths of said leads in said harnesses and of said leads in said cable.

7. A cabinet according to claim 6 in which said cables have respective sheaths which surround said leads in said cables, and which sheaths have respective terminations providing openings into the interiors of such cables and disposed so that such cable leads extend unconstrained by such sheaths forward from such openings to said splices, and in which said encapsulant material seals the passage of such cable leads through such openings at such terminations of said sheaths of said cables.

8. A field encapsulatable splice cabinet for cables comprising, a housing having therein a frontwardly opening bay, wall means bounding and backing the rear of said bay, horizontally offset arrays of terminals disposed on the front side of said wall means, a plurality of wire harnesses respective to said arrays and each comprising insulated wire leads having ends attached in said bay to terminals in the corresponding array, and having other free ends at a free end of the harness, a plurality of horizontally offset splice chambers corresponding to said terminal arrays and each disposed on the back side of said wall means behind the corresponding terminal array on the front side of such wall means, each of said splice chambers comprising a box having an interior bounded by a vertical inner wall provided by said wall means, vertical side walls of said box, and a horizontal bottom wall of said box, said inner wall and bottom wall of each box having respective openings therein for insertion into the interior of said box of the free ends of, respectively, insulated wire leads in one of said cables and said leads in the one of said harnesses coupled to the terminal array corresponding to such box, each such box being adapted to accommodate splices at their free ends of such cable leads and harness leads inserted through such openings, and to thereafter receive encapsulant material effective to encapsulate such splices.

9. A cabinet according to claim 8 in which each splice chamber box has a selectively removable and replaceable outwardly disposed rear cover effective when removed and replaced to provide for such box a rear opening and a rear closure, respectively, for such box.

10. A cabinet according to claim 8 in which each splice chamber box comprises a selectively removable and replaceable lid on the top of such box and effective when removed and replaced to provide a top closure and top opening, respectively, for such box.

11. A cabinet according to claim 8 in which said horizontal bottom wall of each splice chamber box comprises inner and outer horizontally disposed plates which bound inner and outer parts, respectively, of said opening in said bottom wall of said box, and in which said outer plate is removable from said inner plate to permit positioning of such cable in the inner part of said opening by horizontal displacement of said cable.

12. A cabinet according to claim 8 further comprising at least one horizontal tube joined to and extending between said horizontally offset splice chambers and permitting passage through said tube of insulated wire leads from one to the other of said chambers.

* * * * *